(12) United States Patent
Rawat et al.

(10) Patent No.: US 11,275,933 B2
(45) Date of Patent: Mar. 15, 2022

(54) SYSTEMS AND METHODS FOR SEGMENTATION OF REPORT CORPUS USING VISUAL SIGNATURES

(71) Applicant: Genpact Luxembourg S.á r.l, Luxembourg (LU)

(72) Inventors: Pankaj Rawat, Noida (IN); Jyoti Gupta, New Delhi (IN); Armen Kherlopian, Chestnut Ridge, NY (US); Jagjeet Singh, New Delhi (IN)

(*) Notice: Subject to any disclaimer, the term of this patent is extended or adjusted under 35 U.S.C. 154(b) by 0 days.

(21) Appl. No.: 16/452,294

(22) Filed: Jun. 25, 2019

(65) Prior Publication Data

US 2020/0302164 A1 Sep. 24, 2020

Related U.S. Application Data

(60) Provisional application No. 62/722,392, filed on Aug. 24, 2018.

(51) Int. Cl.
*G06K 9/00* (2006.01)
*G06K 9/52* (2006.01)
*G06K 9/62* (2006.01)
*G06Q 10/10* (2012.01)
*G06N 20/10* (2019.01)
(Continued)

(52) U.S. Cl.
CPC .......... *G06K 9/00449* (2013.01); *G06K 9/40* (2013.01); *G06K 9/52* (2013.01); *G06K 9/6218* (2013.01); *G06N 3/08* (2013.01); *G06N 7/005* (2013.01); *G06N 20/10* (2019.01); *G06Q 10/10* (2013.01)

(58) Field of Classification Search
CPC .......... G06K 9/0049; G06K 9/40; G06K 9/52; G06K 9/6218; G06N 20/10; G06N 3/08; G06N 7/005; G06Q 10/10
See application file for complete search history.

(56) References Cited

U.S. PATENT DOCUMENTS

2002/0037097 A1  3/2002  Hoyos et al.
2007/0089049 A1*  4/2007  Gormish ............... G06F 40/166
                                                      715/224

(Continued)

FOREIGN PATENT DOCUMENTS

EP  0248533 A2  12/1987
EP  2407931 A1   1/2012
(Continued)

OTHER PUBLICATIONS

Basilis G. Gatos, "Imaging Techniques in Document Analysis Processes," Chapter 4, 2014, pp. 73-131.
(Continued)

*Primary Examiner* — Srilakshmi K Kumar
*Assistant Examiner* — Umair Ahsan
(74) *Attorney, Agent, or Firm* — Goodwin Procter LLP

(57) ABSTRACT

Systems and methods for segmentation of report corpus using visual signatures are disclosed. According to one embodiment, a computer-implemented method comprises converting a document to a grayscale image and removing noise from the grayscale image by eroding isolated pixels. Connected regions in the grayscale image are determined and a region of the grayscale image having a square shape is identified. An area of the region is computed and if the area is larger than a threshold, determining that the document contains a form.

12 Claims, 26 Drawing Sheets

(51) Int. Cl.
    *G06K 9/40*   (2006.01)
    *G06N 3/08*   (2006.01)
    *G06N 7/00*   (2006.01)

(56) References Cited

U.S. PATENT DOCUMENTS

2018/0032811 A1* 2/2018 Yellapragada ..... G06K 9/00463
2020/0012851 A1* 1/2020 Stanley ................... G06F 16/93

FOREIGN PATENT DOCUMENTS

WO        9322875 A1   11/1993
WO     2020039260 A2    2/2020

OTHER PUBLICATIONS

Couasnon, et al., Recognition of Tables and Forms, Chapter 19, 2014, pp. 647-677.
Simone Marinai, "Page Similarity and Classification," Chapter 7, 2014, pp. 224-253.
Singh, et al., "Finding Connected Components in a Gray Scale Image," AJET, ISSN: 2348-7305, vol. 5, Issue: 2, Dec. 2016.
PCT/IB2019/000961, International Search Report and Written Opinion, dated Dec. 2, 2020.

\* cited by examiner

*010*

*001*

| | CIOMS FORM |
|---|---|
| SUSPECT ADVERSE REACTION REPORT | |

I. REACTION INFORMATION

| 1. PATIENT INITIALS (first, last) | 1a. COUNTRY | 2. DATE OF BIRTH Day \| Month \| Year | 2a. AGE Years | 3. SEX | 4-6 REACTION ONSET Day \| Month \| Year | 8-12 CHECK ALL APPROPRIATE TO ADVERSE REACTION |
|---|---|---|---|---|---|---|
| 7 + 13 DESCRIBE REACTION(S) (including relevant tests/lab data) | | | | | | ☐ PATIENT DIED |
| | | | | | | ☐ INVOLVED OR PROLONGED INPATIENT HOSPITALISATION |
| | | | | | | ☐ INVOLVED PERSISTENCE OR SIGNIFICANT DISABILITY OR INCAPACITY |
| | | | | | | ☐ LIFE THREATENING |

II. SUSPECT DRUG(S) INFORMATION

| 14. SUSPECT DRUG(S) (include generic name) | | 20. DID REACTION ABATE AFTER STOPPING DRUG? ☐ YES ☐ NO ☐ NA |
|---|---|---|
| 15. DAILY DOSE(S) | 16. ROUTE(S) OF ADMINISTRATION | 21. DID REACTION REAPPEAR AFTER REINTRO- DUCTION? ☐ YES ☐ NO ☐ NA |
| 17. INDICATION(S) FOR USE | | |
| 18. THERAPY DATES (from/to) | 19. THERAPY DURATION | |

III. CONCOMITANT DRUG(S) AND HISTORY

| 22. CONCOMITANT DRUG(S) AND DATES OF ADMINISTRATION (exclude those used to treat reaction) |
|---|
| 23. OTHER RELEVANT HISTORY (e.g. diagnostics, allergics, pregnancy with last month of period, etc.) |

IV. MANUFACTURER INFORMATION

| 24a. NAME AND ADDRESS OF MANUFACTURER | |
|---|---|
| 24b. MFR CONTROL NO. | |
| 24c. DATE RECEIVED BY MANUFACTURER | 24d. REPORT SOURCE ☐ STUDY ☐ LITERATURE ☐ HEALTH PROFESSIONAL |
| DATE OF THIS REPORT | 25a. REPORT TYPE ☐ INITIAL ☐ FOLLOWUP |

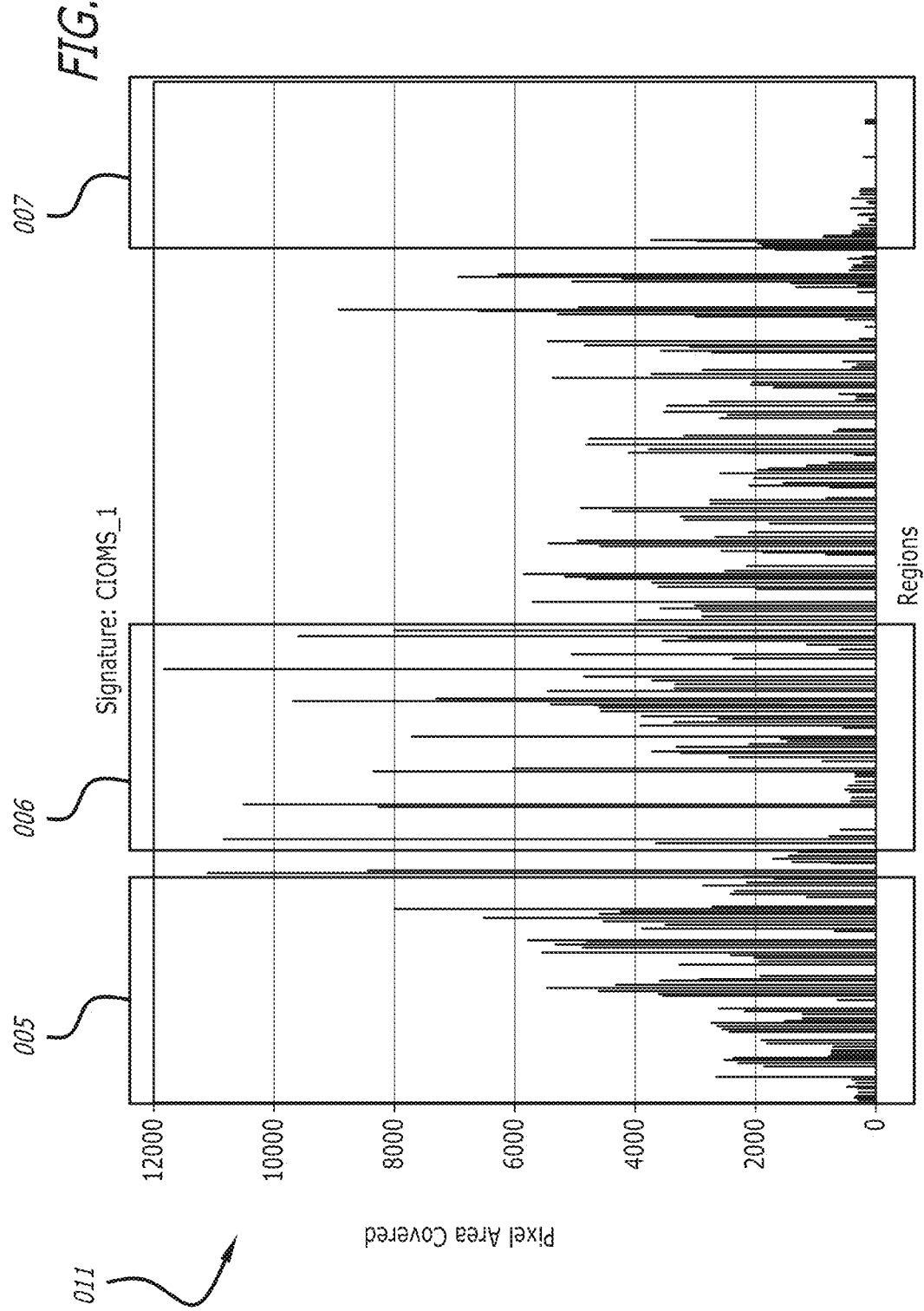

FIG. 1B-1

030

U.S. Department of State
Bureau of Population, Refugees and Migration
SPECIAL IMMIGRANT VISA BIODATA FORM

Special immigrant visa applicants who qualify for and request resettlement assistance from the Department of State must complete this form for each family member and submit it via email as a scanned attachment to the National Visa Center at NVCSIV@state.gov.

A. CASE INFORMATION (To be completed by NVC)

| NVC Case Number | Assigned Post | Post POC Information |
|---|---|---|
| | | |

B. CASE MEMBER

| 1. Case Size (Yourself plus family members traveling with you) | 2. Are you the principal applicant (PA)? ☐ Yes ☐ No | 3. If not, what is your relationship to the PA? (Husband, wife, son, daughter) |
|---|---|---|
| 4. Name as it Appears on your Passport (Last, First, Middle) | | 5. Sex ☐ Male ☐ Female |
| 6. Marital Status | 7. Date of Birth (mm-dd-yyyy) | 8. Place of Birth (City, Country) |
| 9. Nationality | 10. Ethnicity | 11. Religion |

12. Physical Address

13. Phone Number(s)

14. E-mail

15. Last Occupation/Skill

16. Education Level/Field of Study

17. Native Language

18. Other Language(s)

19. English Speaking Ability (Good, Some, None)

20. Health Issues (Condition, Treatment, Pregnancy, Urgency, Comments)

C. CROSS REFERENCE

21. Do you have other immediate family members being processed on their own special immigrant visas? ☐ Yes ☐ No

INVOICE

CATAGORY OF SERVICE-AIR TRAVEL AGEN

AIR TRAVEL BUREAU LIMITED

DOMESTIC NR

Invoice
Date
Code
B.R. No
PNR No.

AAACA0313PST001

PAN NO.

Your account has been debited fro the Purchase of Following tickets

| | ULR/DEL | U | A1505 | 24/32/16 | 4933.00 | ONE | 390.00 | 1007.00 | 8329.00 |
|---|---|---|---|---|---|---|---|---|---|
| 1125936523 | | | | | | | | | |

1125936523  Employee code
           Req. No.

8329.00
69.00
55.00
49.00
2.00
2.00
8348.00
8329.00
39.00

221

CIOMS FORM

SUSPECT ADVERSE REACTION REPORT

I. REACTION INFORMATION

| 1. PATIENT INITIALS (first, last) | 1a. COUNTRY | 2. DATE OF BIRTH | | | 2a. AGE Years | 3. SEX | 4-6 REACTION ONSET | | | 8-12 CHECK ALL APPROPRIATE TO ADVERSE REACTION |
|---|---|---|---|---|---|---|---|---|---|---|
| | | Day | Month | Year | | | Day | Month | Year | |
| 7 + 13 DESCRIBE REACTION(S) (including relevant tests/lab data) | | | | | | | | | | ◻ PATIENT DIED |
| | | | | | | | | | | ◻ INVOLVED OR PROLONGED INPATIENT HOSPITALISATION |
| | | | | | | | | | | ◻ INVOLVED PERSISTENCE OR SIGNIFICANT DISABILITY OR INCAPACITY |
| | | | | | | | | | | ◻ LIFE THREATENING |

II. SUSPECT DRUG(S) INFORMATION

| 14. SUSPECT DRUG(S) (include generic name) | | 20. DID REACTION ABATE AFTER STOPPING DRUG? ◻ YES ◻ NO ◻ NA |
|---|---|---|
| 15. DAILY DOSE(S) | 16. ROUTE(S) OF ADMINISTRATION | 21. DID REACTION REAPPEAR AFTER REINTRODUCTION? ◻ YES ◻ NO ◻ NA |
| 17. INDICATION(S) FOR USE | | |
| 18. THERAPY DATES (from/to) | 19. THERAPY DURATION | |

III. CONCOMITANT DRUG(S) AND HISTORY

| 22. CONCOMITANT DRUG(S) AND DATES OF ADMINISTRATION (exclude those used to treat reaction) |
|---|
| 23. OTHER RELEVANT HISTORY (e.g. diagnostics, allergies, pregnancy with last month of period, etc.) |

IV. MANUFACTURER INFORMATION

| 24a. NAME AND ADDRESS OF MANUFACTURER | | |
|---|---|---|
| | 24b. MFR CONTROL NO. | |
| 24c. DATE RECEIVED BY MANUFACTURER | 24d. REPORT SOURCE ◻ STUDY ◻ LITERATURE ◻ HEALTH PROFESSIONAL | |
| DATE OF THIS REPORT | 25a. REPORT TYPE ◻ INITIAL ◻ FOLLOWUP | |

CIOMS FORM

| SUSPECT ADVERSE REACTION REPORT | |
|---|---|

I. REACTION INFORMATION

| 1. PATIENT INITIALS (first, last) | 1a. COUNTRY | 2. DATE OF BIRTH — Day / Month / Year | 2a. AGE Years | 3. SEX | 4-6 REACTION ONSET — Day / Month / Year | 8-12 CHECK ALL APPROPRIATE TO ADVERSE REACTION |
|---|---|---|---|---|---|---|
| 7 + 13 DESCRIBE REACTION(S) (including relevant tests/lab data) | | | | | | ○ PATIENT DIED<br>○ INVOLVED OR PROLONGED INPATIENT HOSPITALISATION<br>○ INVOLVED PERSISTENCE OR SIGNIFICANT DISABILITY OR INCAPACITY<br>○ LIFE THREATENING |

II. SUSPECT DRUG(S) INFORMATION

| 14. SUSPECT DRUG(S) (include generic name) | 20. DID REACTION ABATE AFTER STOPPING DRUG? ☐ YES ☐ NO ☐ NA |
|---|---|
| 15. DAILY DOSE(S) | 16. ROUTE(S) OF ADMINISTRATION | 21. DID REACTION REAPPEAR AFTER REINTRODUCTION? ☐ YES ☐ NO ☐ NA |
| 17. INDICATION(S) FOR USE | | |
| 18. THERAPY DATES (from/to) | 19. THERAPY DURATION | |

III. CONCOMITANT DRUG(S) AND HISTORY

| 22. CONCOMITANT DRUG(S) AND DATES OF ADMINISTRATION (exclude those used to treat reaction) |
|---|
| 23. OTHER RELEVANT HISTORY (e.g. diagnostics, allergies, pregnancy with last month of period, etc.) |

IV. MANUFACTURER INFORMATION

| 24a. NAME AND ADDRESS OF MANUFACTURER | |
|---|---|
| | 24b. MFR CONTROL NO. |
| 24c. DATE RECEIVED BY MANUFACTURER | 24d. REPORT SOURCE ☐ STUDY ☐ LITERATURE ☐ HEALTH PROFESSIONAL |
| DATE OF THIS REPORT | 25a. REPORT TYPE ☐ INITIAL ☐ FOLLOWUP |

CIOMS FORM

SUSPECT ADVERSE REACTION REPORT

I. REACTION INFORMATION

| 1. PATIENT INITIALS (first, last) | 1a. COUNTRY | 2. DATE OF BIRTH Day / Month / Year | 2a. AGE Years | 3. SEX | 4-6 REACTION ONSET Day / Month / Year | 8-12 CHECK ALL APPROPRIATE TO ADVERSE REACTION |
|---|---|---|---|---|---|---|
| 7 + 13 DESCRIBE REACTION(S) (including relevant tests/lab data) | | | | | | ☐ PATIENT DIED<br>☐ INVOLVED OR PROLONGED INPATIENT HOSPITALISATION<br>☐ INVOLVED PERSISTENCE OR SIGNIFICANT DISABILITY OR INCAPACITY<br>☐ LIFE THREATENING |

II. SUSPECT DRUG(S) INFORMATION

| 14. SUSPECT DRUG(S) (include generic name) | | 20. DID REACTION ABATE AFTER STOPPING DRUG? ☐ YES ☐ NO ☐ NA |
|---|---|---|
| 15. DAILY DOSE(S) | 16. ROUTE(S) OF ADMINISTRATION | 21. DID REACTION REAPPEAR AFTER REINTRO-DUCTION? ☐ YES ☐ NO ☐ NA |
| 17. INDICATION(S) FOR USE | | |
| 18. THERAPY DATES (from/to) | 19. THERAPY DURATION | |

III. CONCOMITANT DRUG(S) AND HISTORY

| 22. CONCOMITANT DRUG(S) AND DATES OF ADMINISTRATION (exclude those used to treat reaction) |
|---|
| 23. OTHER RELEVANT HISTORY (e.g. diagnostics, allergics, pregnancy with last month of period, etc.) |

IV. MANUFACTURER INFORMATION

| 24a. NAME AND ADDRESS OF MANUFACTURER | | |
|---|---|---|
| | 24b. MFR CONTROL NO. | |
| 24c. DATE RECEIVED BY MANUFACTURER | 24d. REPORT SOURCE ☐ STUDY ☐ LITERATURE ☐ HEALTH PROFESSIONAL | |
| DATE OF THIS REPORT | 25a. REPORT TYPE ☐ INITIAL ☐ FOLLOWUP | |

SYSTEMS AND METHODS FOR SEGMENTATION OF REPORT CORPUS USING VISUAL SIGNATURES

RELATED APPLICATIONS

This application claims priority to U.S. provisional patent application 62/722,392, filed Aug. 24, 2018, entitled "SYSTEMS AND METHODS FOR SEGMENTATION OF REPORT CORPUS USING VISUAL SIGNATURES," the entire disclosure, which is hereby incorporated by reference.

FIELD

The present disclosure relates in general to the field of computer software and systems, and in particular, to systems and methods for segmentation of report corpus using visual signatures.

BACKGROUND

When dealing with information extraction from large number of documents, the most common practice is to divide the documents into relevant source types. For example, suppose the goal is to find the source, destination, price, time, etc. within each ticket from a large number of tickets from different vendors and different categories. Below are some examples of tickets:
  Parking Ticket
  Bus Ticket
  Railway Ticket
  Airline Ticket A general extraction process for all the data will not provide an accurate result, as current extraction systems rely on templates for information extraction. Another approach is to target the individual sources/tickets separately and write extraction logic for each of them. The problem with this approach is that finding relevant sources is a huge task. The problem gets even worse when the size of the dataset increases (millions) and it is unknown how many sources exist. Current approaches rely on manual labor or using text based systems to extract information, but either they are not scalable.

Prior approaches include manual extraction that requires someone to manually look at all the source documents and find the common information to categorize the data into buckets. This approach is not scalable and very time consuming.

Another prior approach is text segmentation. With text segmentation, common patterns are found among text extracted from the form and the text is segmented into buckets, e.g. Latent Dirichlet Allocation "LDA" (topic modelling). This approach does not work when most of the words will be repeated. Also, there can be variation among the same type of form e.g. Air Ticket Version1, Air Ticket Version 2. Even though they have the same data, the cell locations in the form can be completely different, leading extraction logic to fail, which was coded according to a single version of the ticket.

SUMMARY

Systems and methods for segmentation of report corpus using visual signatures are disclosed. According to one embodiment, a computer-implemented method comprises converting a document to a grayscale image and removing noise from the grayscale image by eroding isolated pixels. Connected regions in the grayscale image are determined and a region of the grayscale image having a square shape is identified. An area of the region is computed and if the area is larger than a threshold, determining that the document contains a form.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

FIG. 1A-1 illustrates an application form for a suspect adverse reaction report, according to one embodiment.

FIG. 1A-2 illustrates a signature for the adverse reaction form of FIG. 1A-1, according to one embodiment.

FIG. 1B-1 illustrates an application form for voluntary adverse reaction reporting, according to one embodiment.

FIG. 1B-2 illustrates a signature for the voluntary adverse reaction reporting form of FIG. 1B-1, according to one embodiment.

FIG. 1C-1 illustrates an application form for a special immigrant visa, according to one embodiment.

FIG. 1C-2 illustrates a signature for the special immigrant visa form of FIG. 1C-1, according to one embodiment.

FIG. 1D-1 illustrates an application form for a visa and immigration, according to one embodiment.

FIG. 1D-2 illustrates a signature for the visa and immigration form of FIG. 1D-1, according to one embodiment.

FIG. 1E-1 illustrates an application form for a driving license, according to one embodiment.

FIG. 1E-2 illustrates a signature for the driving license form of FIG. 1E-1, according to one embodiment.

FIG. 1F-1 illustrates an invoice, according to one embodiment.

FIG. 1F-2 illustrates a signature for the invoice of FIG. 1F-1, according to one embodiment.

FIG. 2B-1 illustrates one of two identical forms, according to one embodiment.

FIG. 2B-2 illustrates one of two identical forms, according to one embodiment.

FIG. 2B-3 illustrates the signature of one of two identical forms as shown in FIG. 2B-1, according to one embodiment.

FIG. 2B-4 illustrates the signature of one of two identical forms as shown in FIG. 2B-2, according to one embodiment.

FIG. 2C-1 illustrates one of two different forms, according to one embodiment.

FIG. 2C-2 illustrates one of two different forms, according to one embodiment.

FIG. 2C-3 illustrates the signature of one of two different forms as shown in FIG. 2C-1, according to one embodiment.

FIG. 2C-4 illustrates the signature of one of two different forms as shown in FIG. 2C-2, according to one embodiment.

FIG. 3 illustrates an exemplary key page locator process, according to one embodiment.

FIG. 4 illustrates the present process for determining a document's type, according to one embodiment.

Figures 1, 1B, 2:
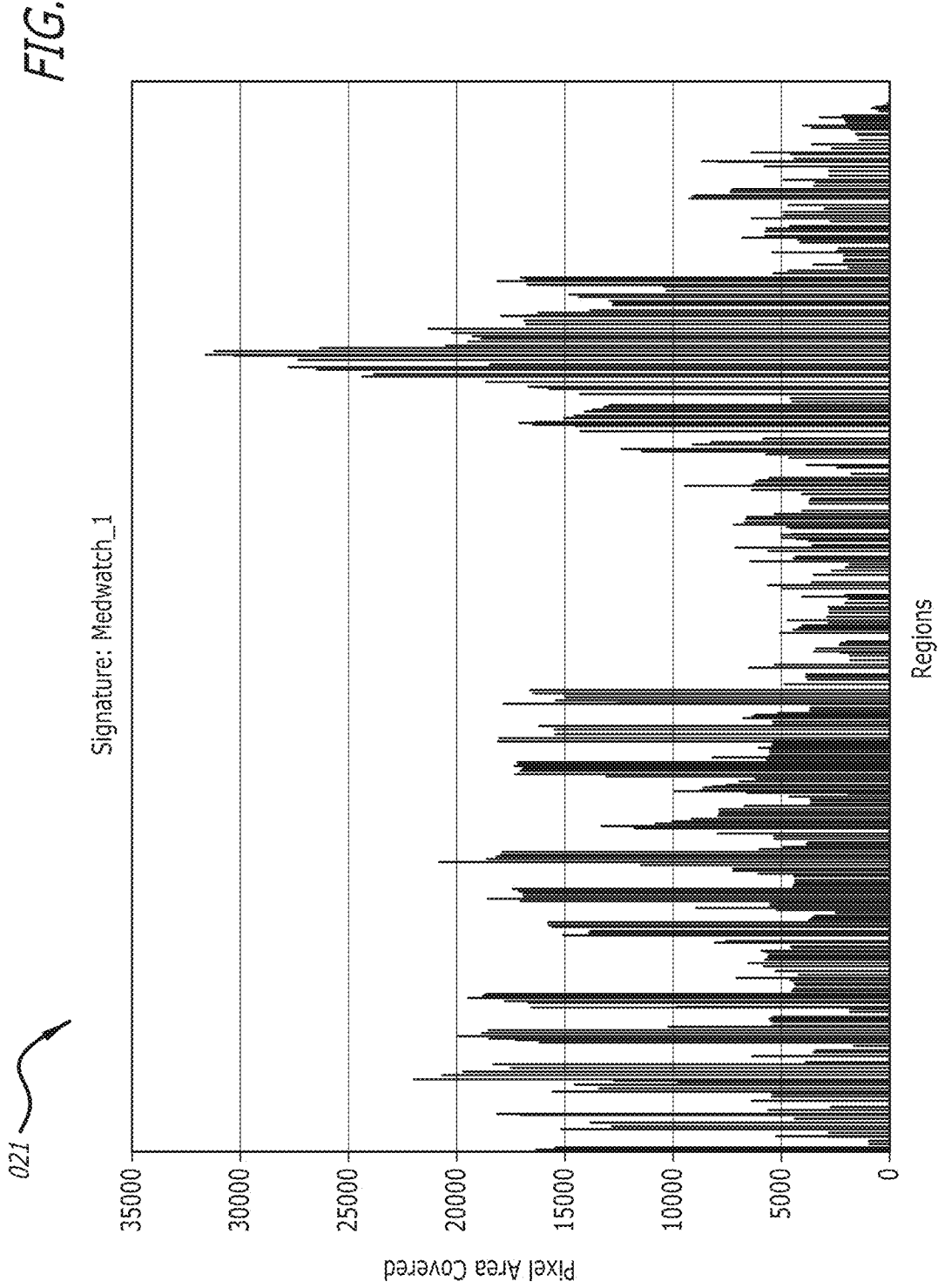

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Systems and methods for segmentation of report corpus using visual signatures are disclosed. According to one embodiment, a computer-implemented method comprises converting a document to a grayscale image and removing noise from the grayscale image by eroding isolated pixels. Connected regions in the grayscale image are determined and a region of the grayscale image having a square shape is identified. An area of the region is computed and if the area is larger than a threshold, determining that the document contains a form.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

According to one embodiment, the present system creates a signature for a document. FIG. 1A illustrates an application form for a suspect adverse reaction report and a signature for the adverse reaction form, according to one embodiment. The adverse reaction form 010 form has a signature 011. The signature 011 can be an n dimensional vector which represents the document. To calculate the signature of the document, the document is divided into a 10×10 grid providing 100 dimensions. All the pixel values in a grid are summed to provide 100 features, one feature for each of the 100 grids. These features act as a signature. For example, the 10×10 grids in section 002, may result in the second portion 006 of the signature 011; and the 10×10 grids in section 003, may result in the third portion 007 of the signature 011.

FIG. 1B illustrates an application form for voluntary adverse reaction reporting and a signature for the voluntary adverse reaction reporting form, according to one embodiment. The signature 021 can be an n dimensional vector which represents the document. To calculate the signature 021 of the document, the document 020 is divided into a 10×10 grid providing 100 dimensions. All the pixel values in a grid are summed to provide 100 features.

Figures 1, 1C, 2:
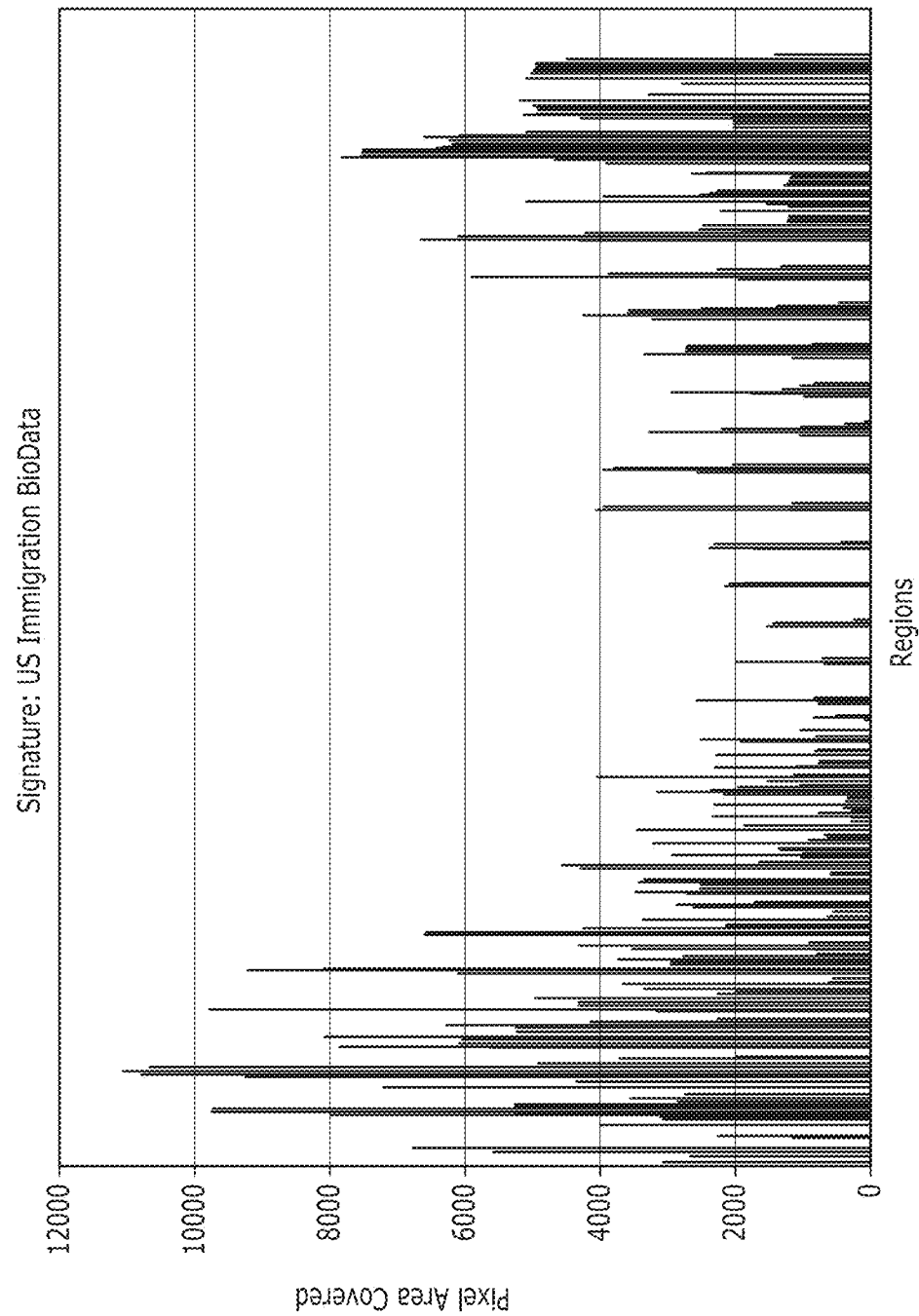

FIG. 1C illustrates an application form for a special immigrant visa and a signature for the special immigrant visa form, according to one embodiment. The signature 031 can be an n dimensional vector which represents the document. To calculate the signature 031 of the document, the document 030 is divided into a 10×10 grid providing 100 dimensions. All the pixel values in a grid are summed to provide 100 features.

Figures 1, 1D:
Figures 1, 1D, 2:
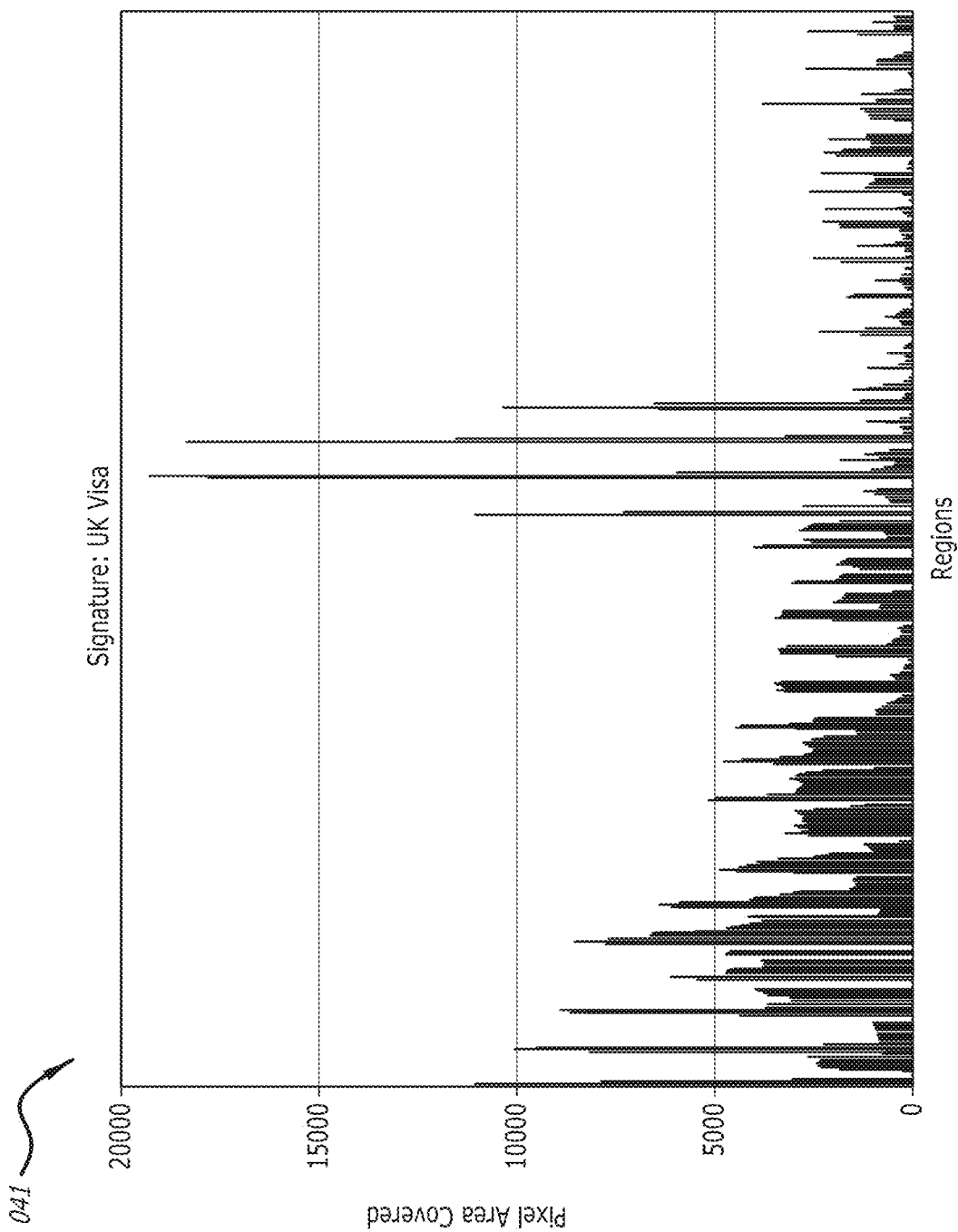

FIG. 1D illustrates an application form for a visa and immigration and a signature for visa and immigration form, according to one embodiment. The signature 041 can be an n dimensional vector which represents the document. To calculate the signature 041 of the document, the document 040 is divided into a 10×10 grid providing 100 dimensions. All the pixel values in a grid are summed to provide 100 features.

Figures 1, 1E:
Figures 1, 1E, 2:
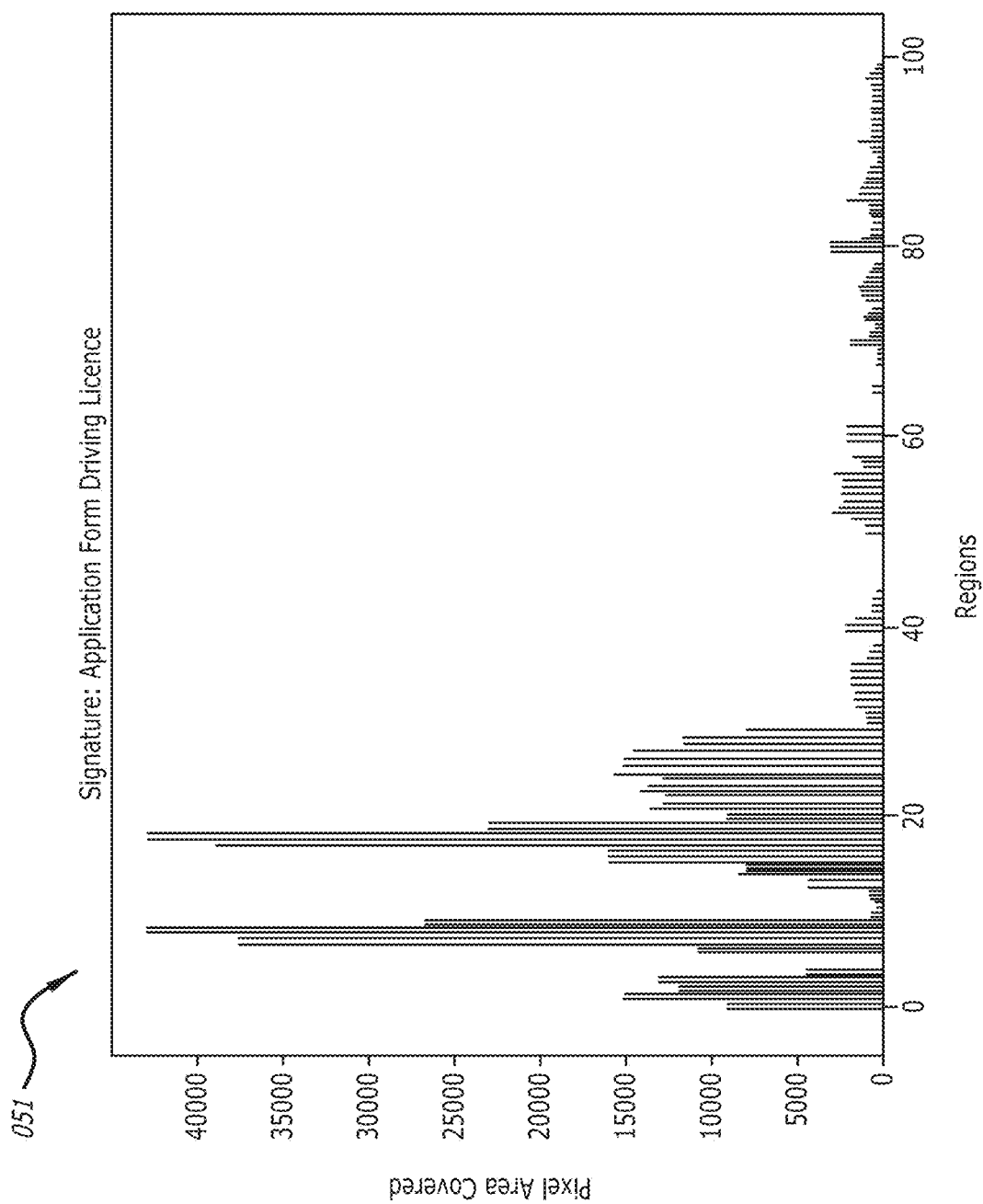

FIG. 1E illustrates an application form for a driving license and a signature for the driving license form, according to one embodiment. The signature 051 can be an n dimensional vector which represents the document. To calculate the signature 051 of the document, the document 050 is divided into a 10×10 grid providing 100 dimensions. All the pixel values in a grid are summed to provide 100 features.

Figures 1, 1F, 2:
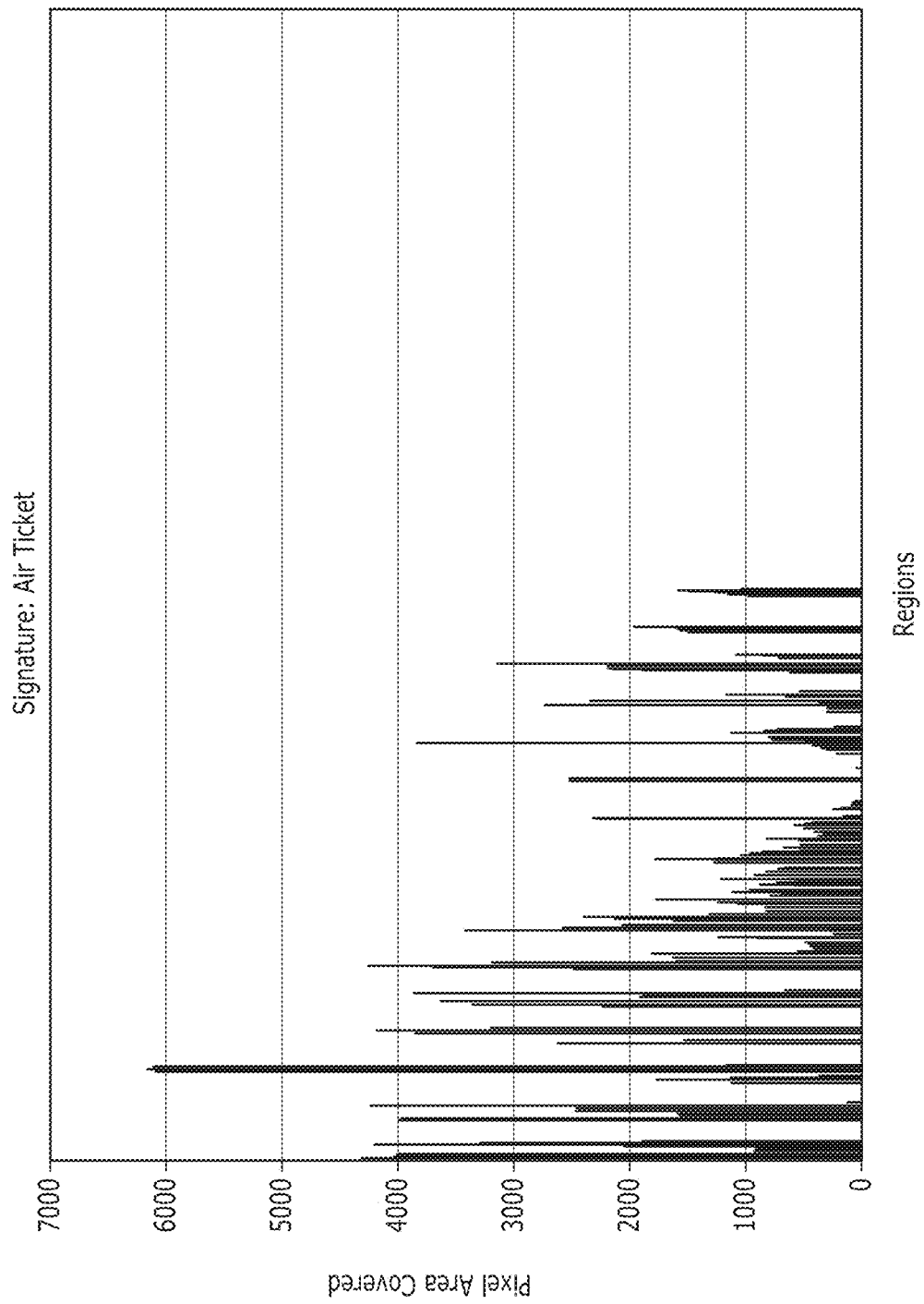

FIG. 1F illustrates an invoice and a signature for the invoice, according to one embodiment. The signature 061 can be an n dimensional vector which represents the document. To calculate the signature 061 of the document, the document 060 is divided into a 10×10 grid providing 100 dimensions. All the pixel values in a grid are summed to provide 100 features.

Figure 2A:
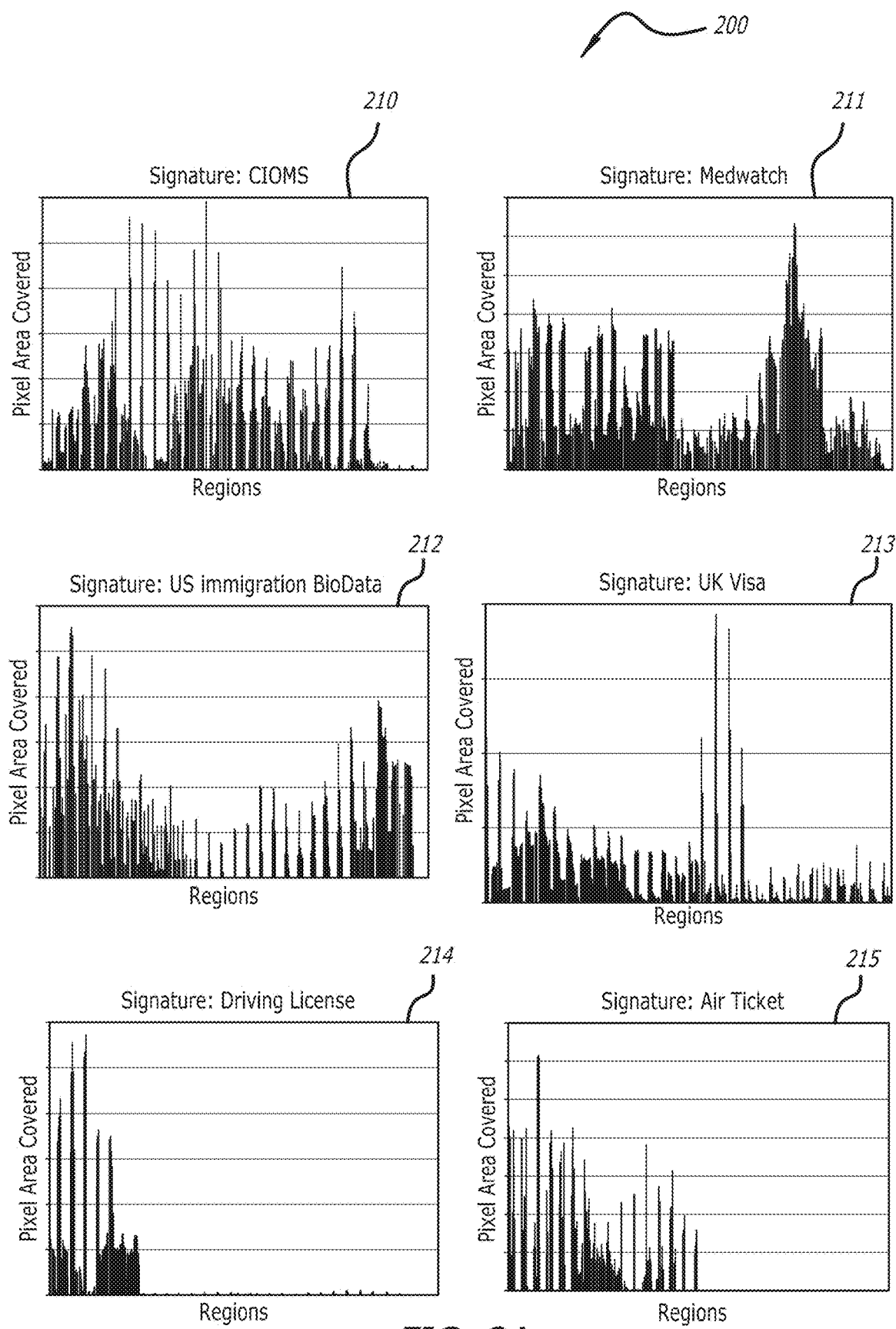
FIG. 2A illustrates the signature of various forms, according to one embodiment.

FIG. 2A illustrates the signature of various documents, according to one embodiment. Each of the signatures 200 are unique. Signature 210 is the suspect adverse reaction signature 011. Signature 211 is the voluntary adverse reaction signature 021.

Signature 212 is the special immigrant visa signature 031. Signature 213 is the visa and immigration signature 041. Signature 214 is the driving license signature 051. Signature 215 is the invoice signature 051.

The difference between each signature may be determined using the pairwise difference between each signature. The pairwise difference is an Euclidian metric which is square root of sum of square between two arrays. The greater the pairwise difference the more likely two forms are different. The smaller the pairwise difference the more likely two forms are the same. Table 1 provides the pairwise difference for four forms, two similar CIOMS forms (CIOMS_1 and CIOMS_2) and two similar Medwatch forms (Medwatch_1 and Medwatch_2). As Table 1 shows, CIOMS_1 and CIOMS_2 have a pairwise difference of 11,672.66. Medwatch_1 and Medwatch_2 have a pairwise difference of 6,309.81. Each of these pairwise differences is low, according to one embodiment.

In contrast, when CIOMS_1 and Medwatch_1 are compared, the pairwise difference is 273,051.75. Similarly, when CIOMS_2 and Medwatch_1 are compared, the pairwise difference is 270,129.71. When CIOMS_2 and Medwatch_2 are compared, the pairwise difference is 269,801.33. when CIOMS_1 and Medwatch_2 are compared, the pairwise difference is 273,429.48. When the forms are different forms, rather than the information in the forms being different, the pairwise difference is 10-30 times greater than the pairwise difference of the same forms with different information filled-in the form. Accordingly, thresholds may be set to identify forms as being the same or different.

TABLE 1

|  | CIOMS_1 | CIOMS_2 | Medwatch_1 | Medwatch_2 |
| --- | --- | --- | --- | --- |
| CIOMS_1 | 0.00 | 11672.66 | 273051.75 | 273429.48 |
| CIOMS_2 | 11672.66 | 0.00 | 270129.71 | 269801.33 |
| Medwatch_1 | 273051.75 | 270129.71 | 0.00 | 6309.81 |
| Medwatch_2 | 273429.48 | 269801.33 | 6309.81 | 0.00 |

Figures 2, 2B, 3:
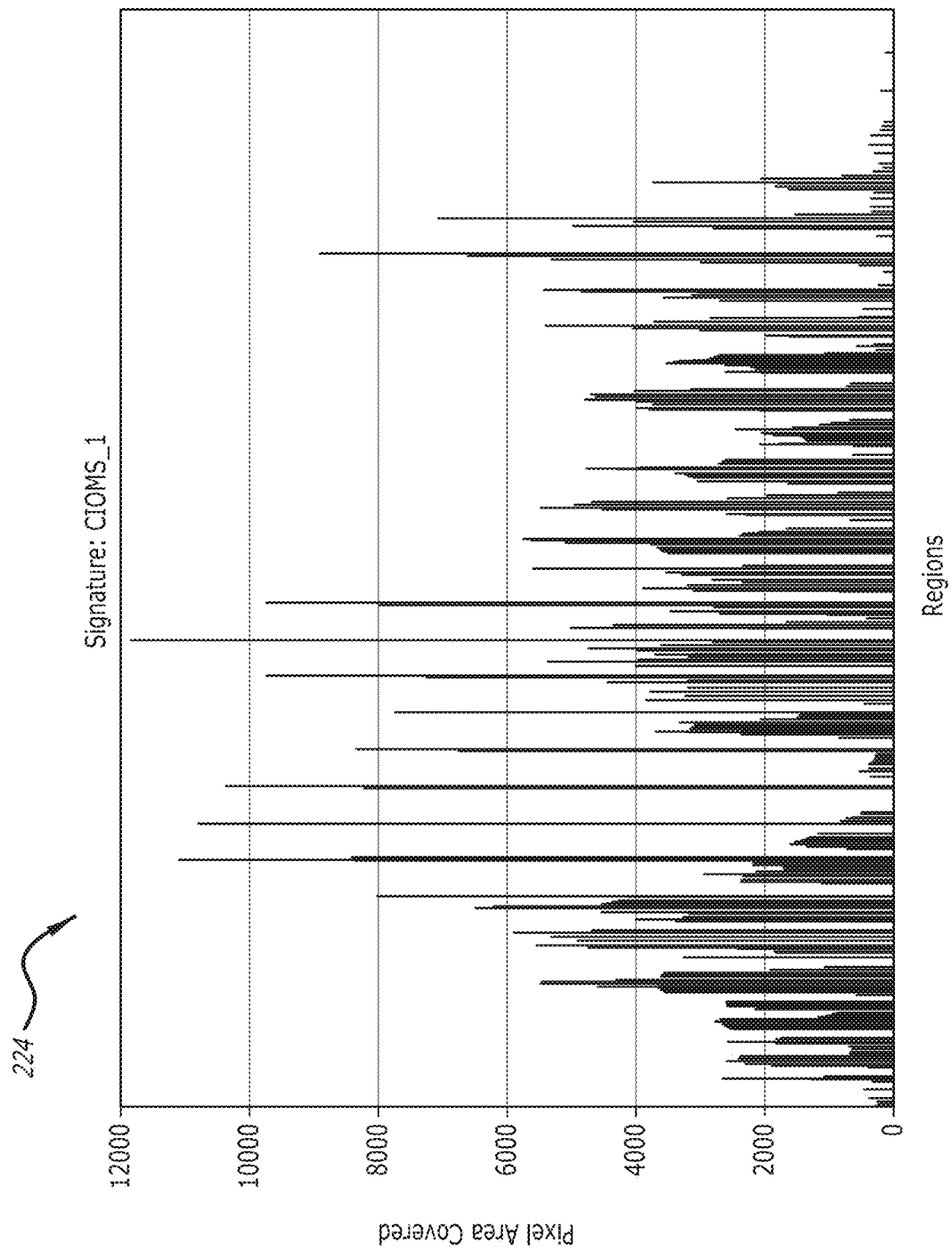

FIG. 2B illustrates the signature of two identical forms (and their respective forms), according to one embodiment. As can be seen from the images 220, the signatures are nearly identical for CIOMS_1 224 and CIOMS_2 225.

Figures 2, 2B, 3, 4:
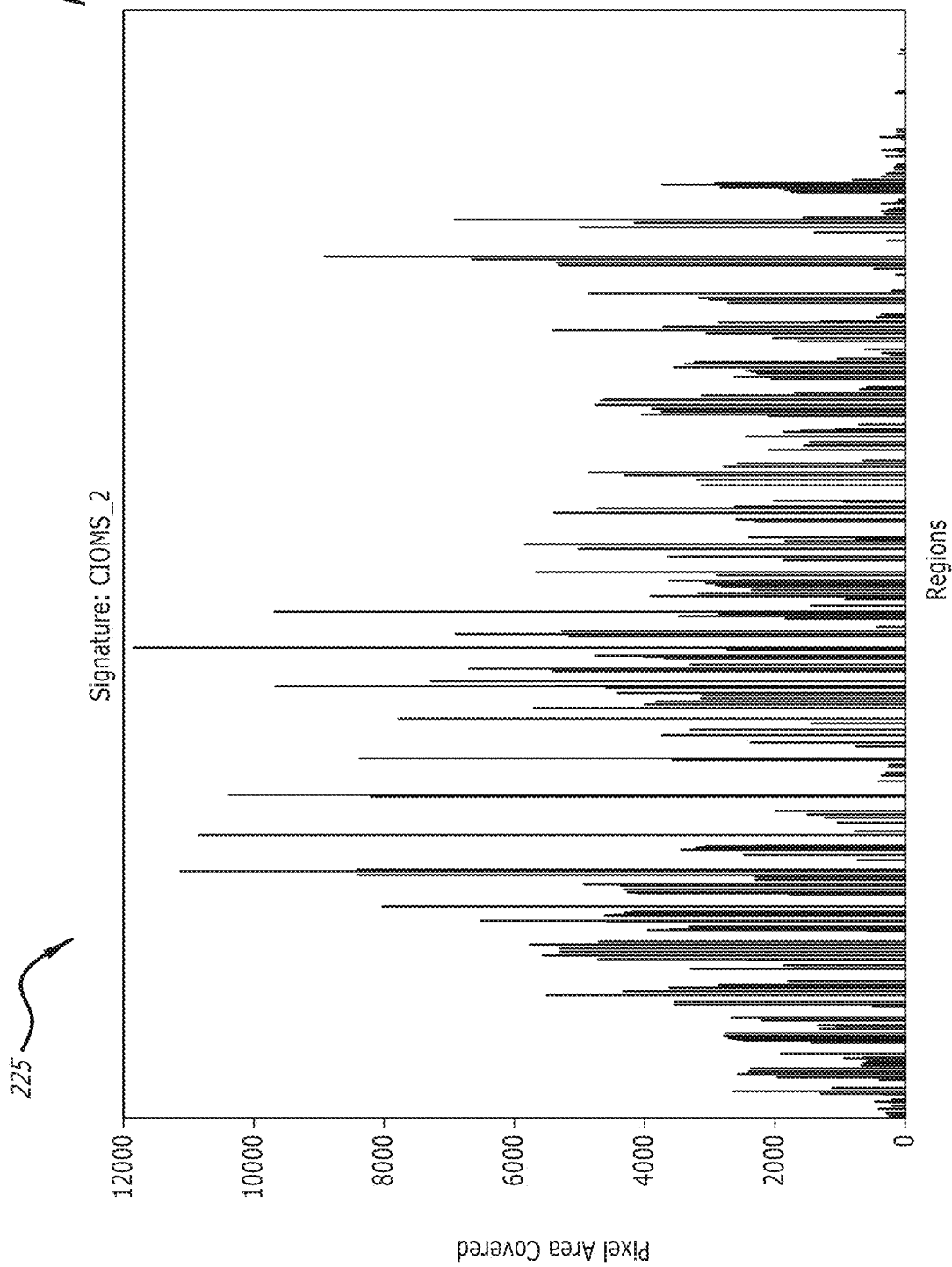
Figures 2, 2C, 3:
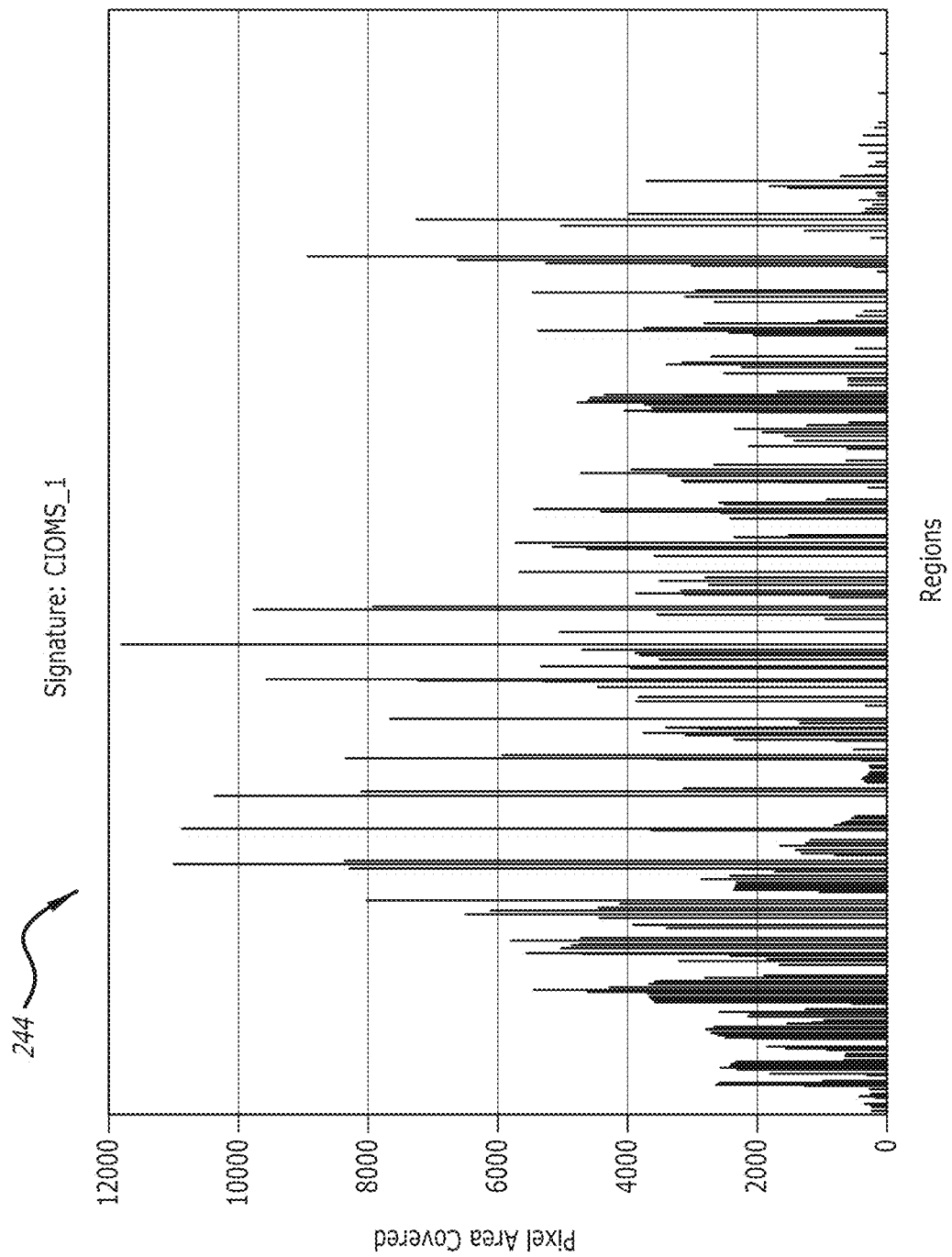
Figures 2, 2C, 3, 4:
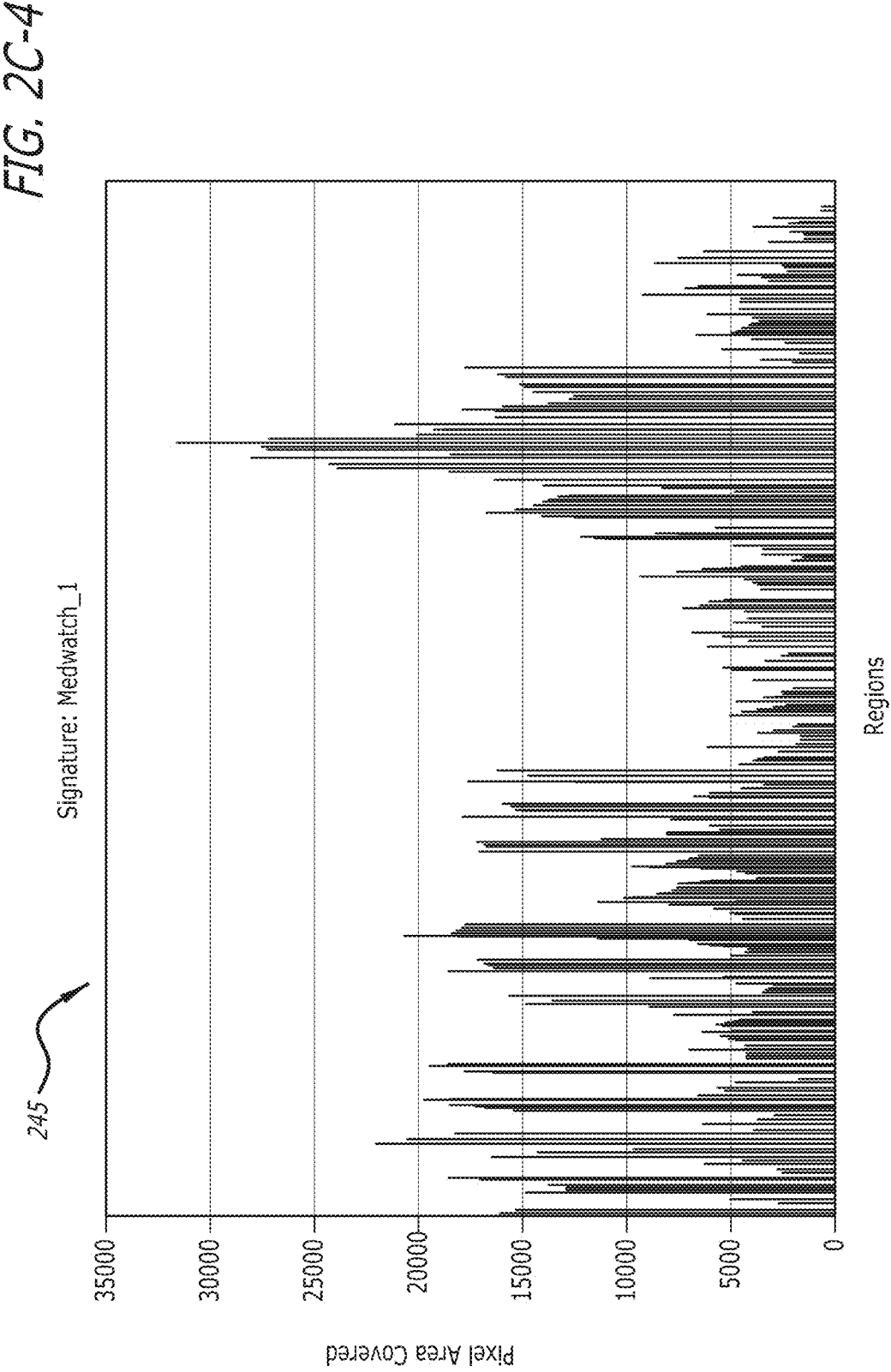
Figure 3:
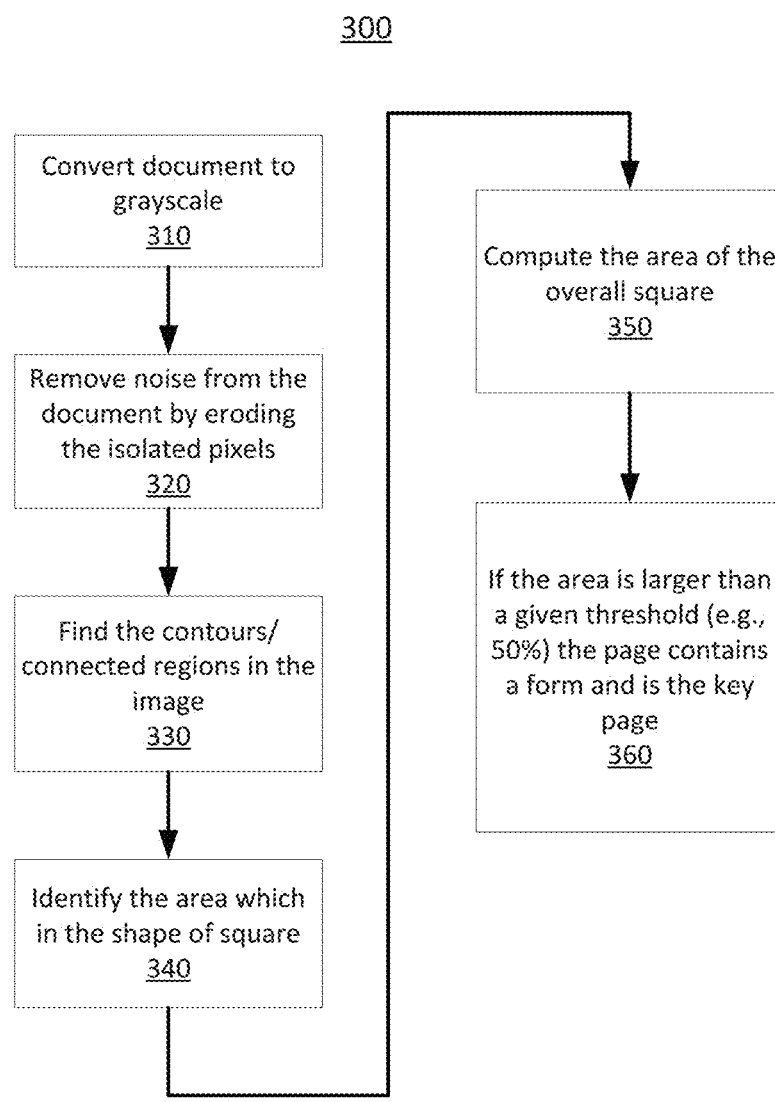
Figure 4:
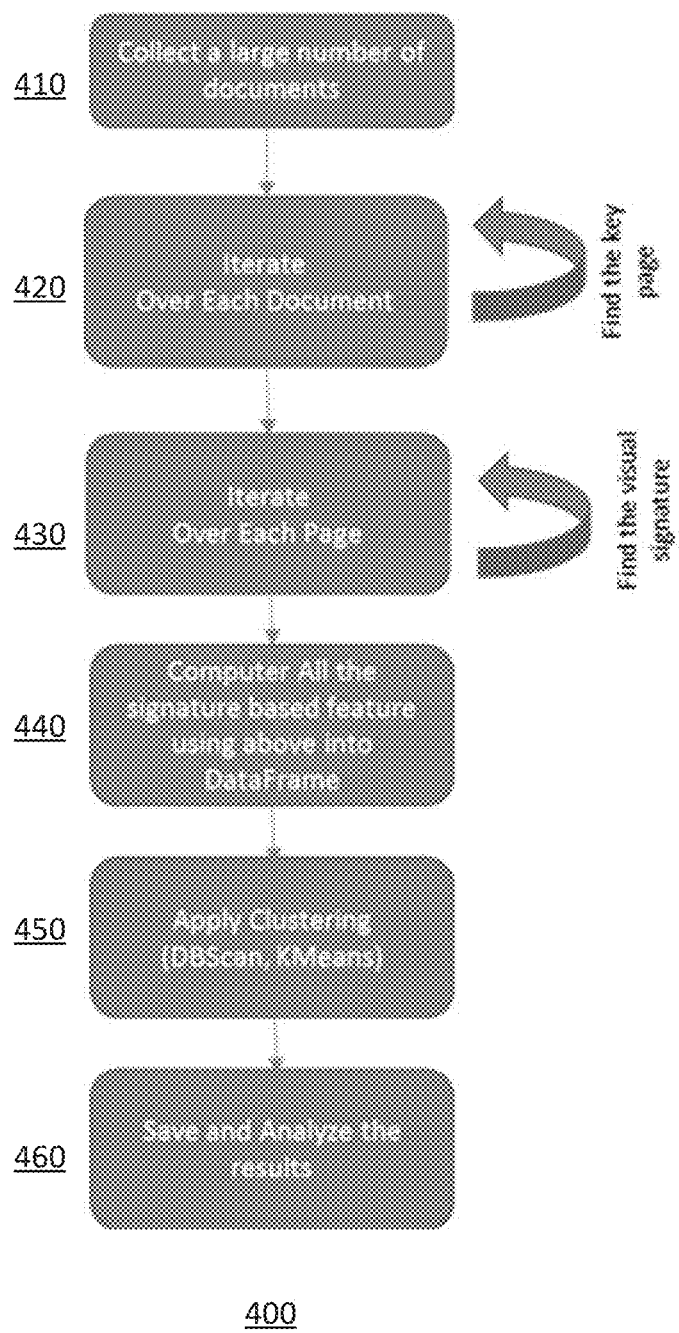

FIG. 2C illustrates the signature of two different forms (and their respective forms), according to one embodiment. As can be seen from the images 240, the signatures are very different for CIOMS_1 244 and Medwatch_1 245.

FIG. 3 illustrates an exemplary key page locator process 300, according to one embodiment. When a document contains multiple pages, the present system locates the main indicator (e.g., key) page among those pages. The key page locating process is as follows:

a. Convert the document to a Grayscale image (310).
  b. Remove noise from the document by eroding the isolated pixels (320). To remove noise the present system uses image processing techniques of dilation and erosion which ensures that isolated pixels are eroded.
  c. Find the contours/connected regions in the image (330). This highlights all the boundaries that make the cells. Contours are a curve joining all the continuous points (along the boundary), having same color or intensity. A tool, such as Open Source Computer Vision's cv.findContours may be used.
  d. Identify the area which is in the shape of a square (340). Pick the outer boundaries only (to remove any duplicates).
  e. Compute the area of the overall square (350).
  f. If the area is larger than a given threshold (e.g., 50%) the page contains a form and is the key page (360).

FIG. 4 illustrates the present process for determining a document's type 400, according to one embodiment.

1. Collect a large number of documents (410).
  2. For each document find the key page (420), as described above in process 300.
  3. Compute the visual signature of the document (430), as described above in process 300.
  4. Save all the visual signature features into a large matrix of m×n shape, where m is the number of documents and n is the number of features (440).
  5. Apply a clustering algorithm e.g., DBScan, Kmean (450).
  6. Save the clusters to a disk, where the clusters were identified above after computing the silhouette score (460). Each document will be assigned an ID and the present system saves each document with its assigned ID.

In the case of Kmean (450), because the number of clusters supplied is unknown, silhouette analysis determines the number of clusters. Here the square root and cube root of the available number of reports is taken. Kmean is run with each n (e.g., feature), and then the silhouette score is evaluated. Silhouette refers to a method of interpretation and validation of consistency within clusters of data. The technique provides a succinct graphical representation of how well each object lies within its cluster. The silhouette value is a measure of how similar an object is to its own cluster (cohesion) compared to other clusters (separation). The silhouette ranges from −1 to +1, where a high value indicates that the object is well matched to its own cluster and poorly matched to neighboring clusters. If most objects have a high value, then the clustering configuration is appropriate. If many points have a low or negative value, then the clustering configuration may have too many or too few clusters. The silhouette can be calculated with any distance metric, such as the Euclidean distance or the Manhattan distance. The feature which matches a criteria/threshold/max will be used to run the final Kmean with that n. For example, if there are 200,000 reports, the square-root of 200,000 is 447 and cube-root of 200,000 is 58 approx. Kmean is run with range (58, 447). Once the score is computed, the system decides which number has the highest silhouette score.

Identifying a New Form at Runtime

The present system may use a classification technique such as a support vector machine (SVM), or a convolutional neural network (CNN), etc. In machine learning, SVMs are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on which side of the gap they fall.

A Convolutional Neural Network (CNN) has one or more convolutional layers (often with a subsampling step) and then followed by one or more fully connected layers as in a standard multilayer neural network. The architecture of a CNN is designed to take advantage of the 2D structure of an input image (or other 2D input such as a speech signal). This is achieved with local connections and tied weights followed by some form of pooling which results in translation invariant features.

The present system can also use the same model which was generated earlier. Each cluster is associated with a cluster center which points to a centroid location of the cluster. When the system processes a new document, the present system computes the distance (Manhattan/cosine) of its signature with the available cluster centers. The present system picks the cluster which has the minimum distance and compares that minimum distance to a predefined threshold to determine if the document should be assigned to that cluster. If the document is assigned, then the system assigns the report type for that document, otherwise the document is categorized as an unknown report type.

Figure 5:
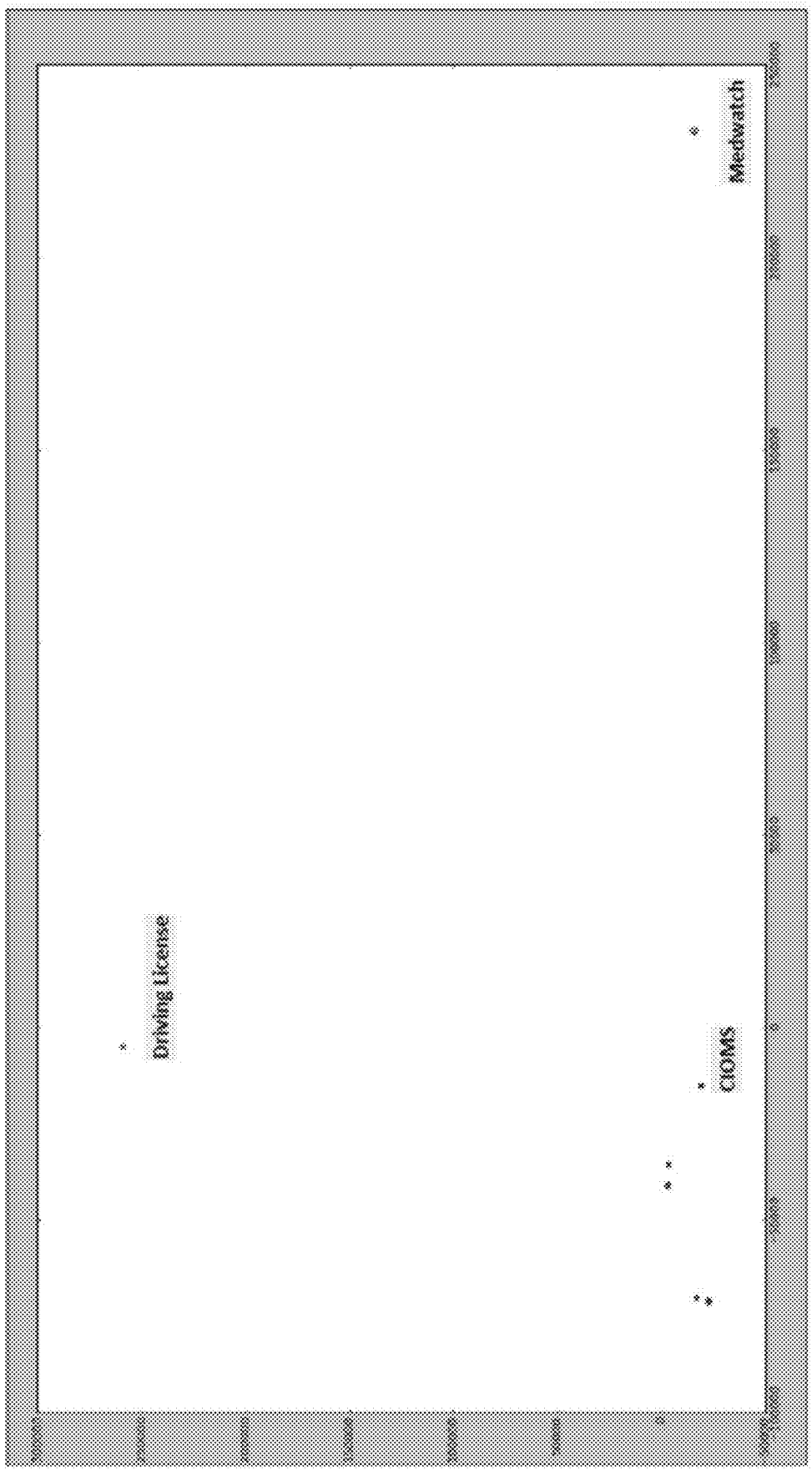
FIG. 5 illustrates an exemplary PCA output of different document clusters, according to one embodiment.

FIG. 5 illustrates an exemplary Principal component Analysis (PCA) output 500 of different document clusters, according to one embodiment. FIG. 5 is a 2D representation, however, in 100D the output would be wide apart. PCA output 500 shows that driving license forms will be clustered together towards the top of PCA output 500, according to one embodiment. PCA output 500 shows that Medwatch forms will be clustered together towards the bottom right corner of PCA output 500, according to one embodiment. PCA output 500 shows that CIOMS forms will be clustered together towards the bottom left of PCA output 500, according to one embodiment.

The present system may be used for information extraction, field extraction planning, or other similar purpose.

Information extraction—As mentioned above the technique can be used to determine report types in a large pool of reports quickly, thus reducing the manual effort of looking into each document, individually.

Field Extraction Planning—The present system can improve the process by which fields (e.g., amount, name, etc.) are extracted from the reports using OCR templates. Each report type is associated with a template which is used to extract information from that report type. These templates carry the coordinate information for the fields within the report. Given a large number of reports, the present method determines the totally number of report types. With that information, the system knows how many templates should be created, hence providing for efficient project planning.

Figure 6:
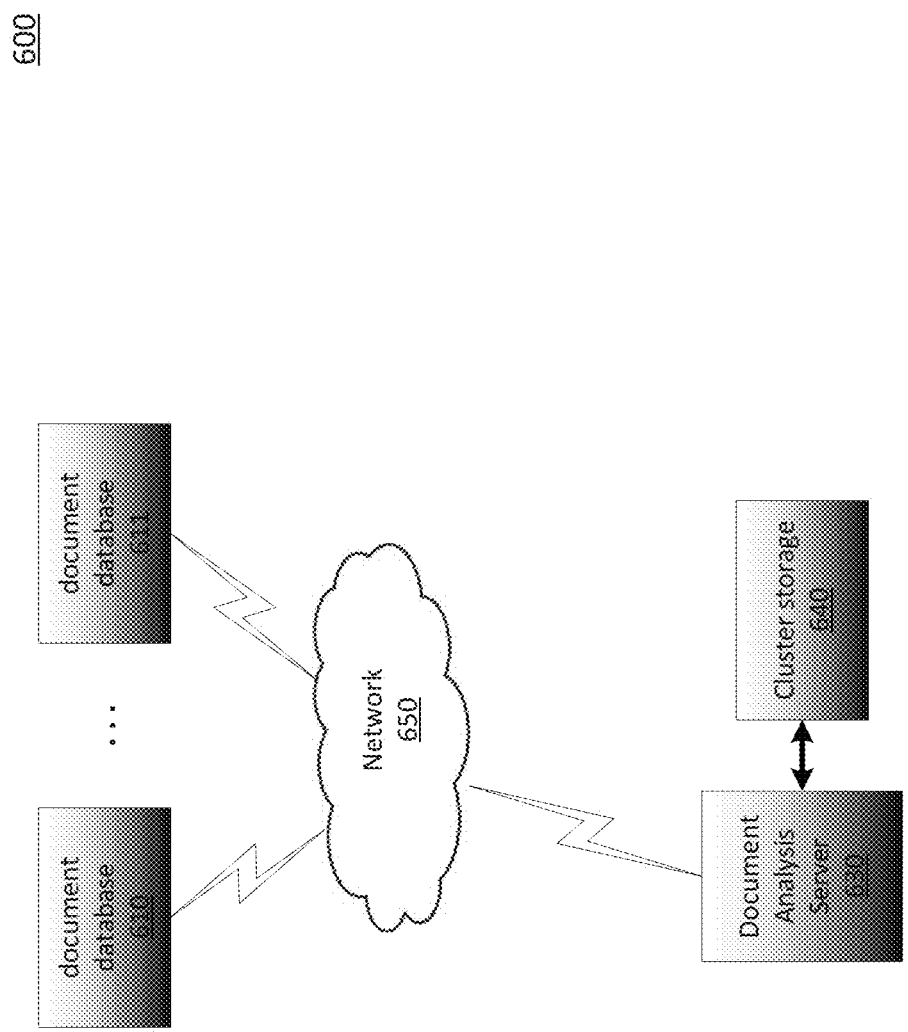
FIG. 6 illustrates an exemplary system for identifying reports using visual signatures 600, according to one embodiment.

FIG. 6 illustrates an exemplary system for identifying reports using visual signatures 600, according to one embodiment. System 600 includes a number of document databases 610, 611 that may store various forms having different formats, as described above. Document analysis server 630 communicates with document databases 610, 611 through network 650. Document analysis server 630 performs key page locator process 300 and document type identification process 400, according to one embodiment. Report analysis server 630 stores document clusters and silhouette scores in cluster storage 640, according to one embodiment.

Figure 7:
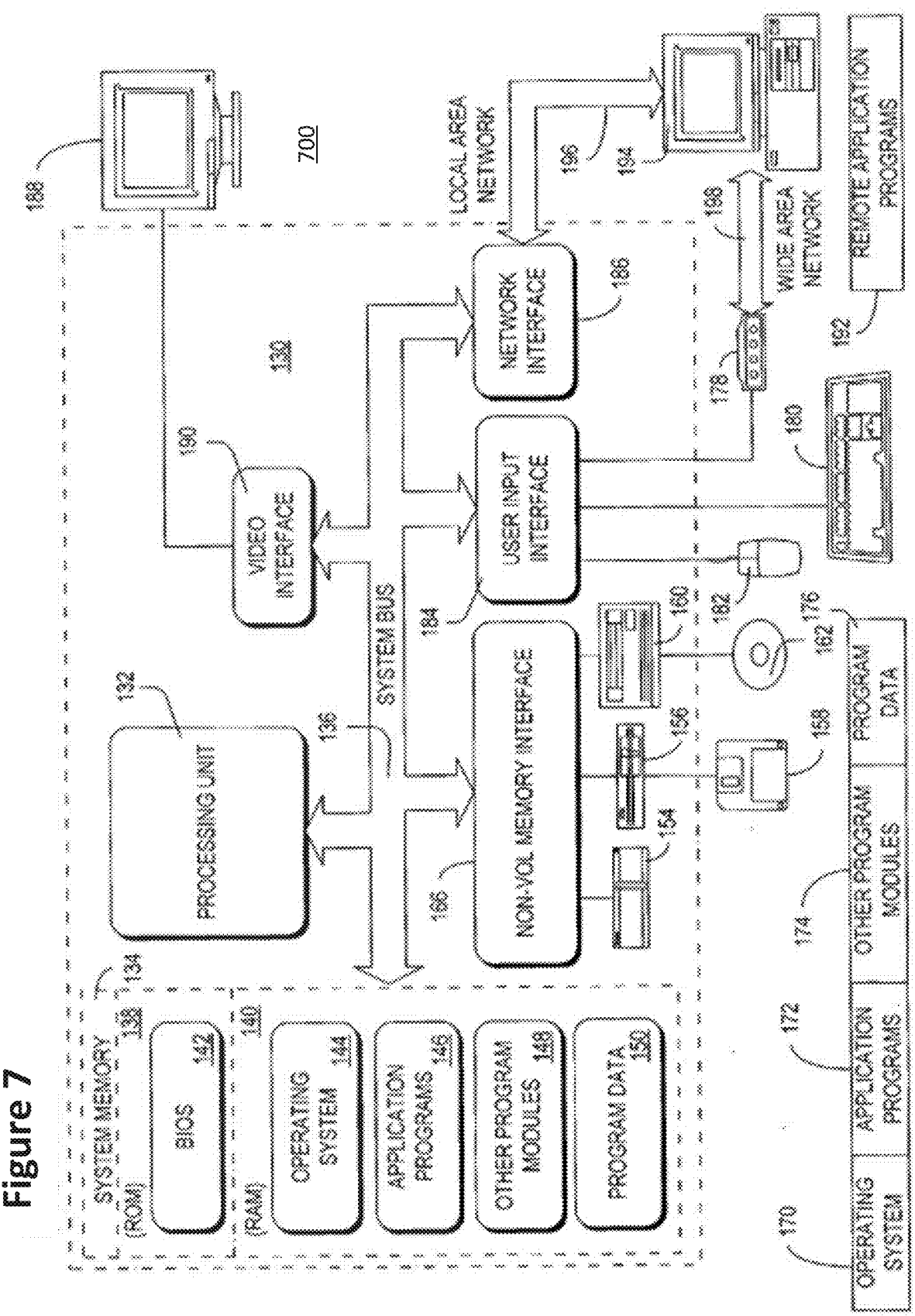
FIG. 7 shows an exemplary general purpose computing device in the form of a computer, according to one embodiment.

FIG. 7 shows an exemplary general purpose computing device in the form of a computer 130, according to one embodiment. A computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 144, and magnetic disk drive 156 and optical disk drive 160 are typically connected to the system bus 136 by a nonvolatile memory interface, such as interface 166.

The drives or other mass storage devices and their associated computer storage media discussed above, provide storage of computer readable instructions, data structures, program modules and other data for the computer 130. Hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 194, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

While the present disclosure has been described in terms of particular embodiments and applications, summarized form, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the scope of the present disclosure.

What is claimed is:

1. A computer-implemented method, comprising:
converting a document to a grayscale image;
removing noise from the grayscale image by eroding isolated pixels;
determining connected regions in the grayscale image;
identifying a region of the grayscale image having a square shape;
computing an area of the region;
if the area is larger than a threshold, determining that the document contains a form; and
comparing the form with a second form to determine if the second form is similar to the form, wherein comparing the form comprises:
dividing the form into a plurality of grids;
summing pixels in each grid of the plurality of grids;
dividing the second form into a second plurality of second grids;
summing pixels in each second grid of the plurality of second grids; and
comparing the form further comprises computing a pairwise difference between a grid of the plurality of grids with a second grid of the second plurality of grids.

2. The computer-implemented method of claim 1, wherein comparing the form further comprises determining the second form is similar to the form if the pairwise difference is less than a second threshold.

3. The computer-implemented method of claim 2, wherein comparing the form further comprises determining the second form is different from the form if the pairwise difference is greater than the second threshold.

4. The computer-implemented method of claim 3, further comprising clustering a plurality of forms using a silhouette score into a first cluster and a second cluster.

5. The computer-implemented method of claim 4, further comprising using a first data extraction process specific to a first structure of the first cluster of forms and using a second data extraction process specific to a second structure of the second cluster of forms.

6. The computer-implemented method of claim 5, further comprising providing a unique identifier to each form.

7. A system, comprising:
a plurality of document databases containing forms and non-forms;
a network interconnecting the plurality of document databases;
a document analysis server that converts a document from a document database to a grayscale image, removes noise from the grayscale image by eroding isolated pixels, determines connected regions in the grayscale image; identifies a region of the grayscale image having a square shape, computes an area of the region, if the area is larger than a threshold, determines that the document contains a form; compares the form with a second form to determine if the second form is similar to the form, wherein comparing the form comprises dividing the form into a plurality of grids and summing pixels in each grid of the plurality of grids; divides the second form into a second plurality of second grids and sums pixels in each second grid of the plurality of second grids; and computes a pairwise difference between a grid of the plurality of grids with a second grid of the second plurality of grids.

8. The system of claim 7, wherein the document analysis server determines whether the second form is similar to the form if the pairwise difference is less than a second threshold.

9. The system of claim 8, wherein the document analysis server determines the second form is different from the form if the pairwise difference is greater than the second threshold.

10. The system of claim 9, wherein the document analysis server clusters a plurality of forms using a silhouette score into a first cluster and a second cluster.

11. The system of claim 10, wherein the document analysis server uses a first data extraction process specific to a first structure of the first cluster of forms and uses a second data extraction process specific to a second structure of the second cluster of forms.

12. The system of claim 11, wherein the document analysis server provides a unique identifier to each form.

* * * * *